(12) United States Patent  (10) Patent No.: US 9,114,462 B2
Glaser et al.  (45) Date of Patent: Aug. 25, 2015

(54) DRILL AND A PRODUCTION METHOD FOR A DRILL

(75) Inventors: Arno Glaser, Schaanwald (LI); Steven Moseley, Nenzing-Gurtis (AT)

(73) Assignee: HILTI AKTIENGESELLSCHAFT (LI)

( * ) Notice: Subject to any disclaimer, the term of this patent is extended or adjusted under 35 U.S.C. 154(b) by 397 days.

(21) Appl. No.: 13/601,089

(22) Filed: Aug. 31, 2012

(65) Prior Publication Data

US 2013/0089384 A1  Apr. 11, 2013

(30) Foreign Application Priority Data

Sep. 1, 2011 (DE) .......................... 10 2011 081 948

(51) Int. Cl.
| | |
|---|---|
| *B23B 51/02* | (2006.01) |
| *B25D 17/02* | (2006.01) |
| *B22F 7/04* | (2006.01) |
| *B23B 51/00* | (2006.01) |
| *B22F 7/06* | (2006.01) |
| *B23P 15/32* | (2006.01) |
| *C22C 29/08* | (2006.01) |
| *C22C 19/07* | (2006.01) |
| *C22C 38/08* | (2006.01) |
| *C22C 38/10* | (2006.01) |

(52) U.S. Cl.
CPC . *B23B 51/02* (2013.01); *B22F 7/04* (2013.01); *B22F 7/062* (2013.01); *B23B 51/00* (2013.01); *B23P 15/32* (2013.01); *B25D 17/02* (2013.01); *C22C 19/07* (2013.01); *C22C 29/08* (2013.01); *C22C 38/08* (2013.01); *C22C 38/105* (2013.01); *B23B 2222/28* (2013.01); *B23B 2222/41* (2013.01); *B23C 2228/49* (2013.01); *Y10T 408/78* (2015.01); *Y10T 408/89* (2015.01)

(58) Field of Classification Search
USPC ............................................. 175/425; 408/144
See application file for complete search history.

(56) References Cited

U.S. PATENT DOCUMENTS

| 5,541,006 A | 7/1996 | Conley | |
|---|---|---|---|
| 8,777,527 B2 * | 7/2014 | Glaser et al. | 408/144 |
| 2010/0003093 A1 * | 1/2010 | Miyanaga | 408/144 |
| 2010/0290849 A1 * | 11/2010 | Mirchandani | 408/144 |

FOREIGN PATENT DOCUMENTS

DE  69516722 T2  11/2000

OTHER PUBLICATIONS

DE Communication, Jun. 12, 2012 in Application No. 102011081948.7 (4 pages).

* cited by examiner

*Primary Examiner* — Kenneth L Thompson
(74) *Attorney, Agent, or Firm* — McAndrews, Held & Malloy, Ltd.

(57) ABSTRACT

A drill includes a drill bit, an intermediate part, and a shaft. The drill bit is made from a sintered carbon-containing hard metal. The intermediate part is made from steel and arranged along an axis between the drill bit and the shaft. An activity of carbon in the steel of the intermediate part is greater at a temperature ranging from 1100° C. to 1450° C. than an activity of carbon in the sintered hard metal at the temperature.

19 Claims, 1 Drawing Sheet

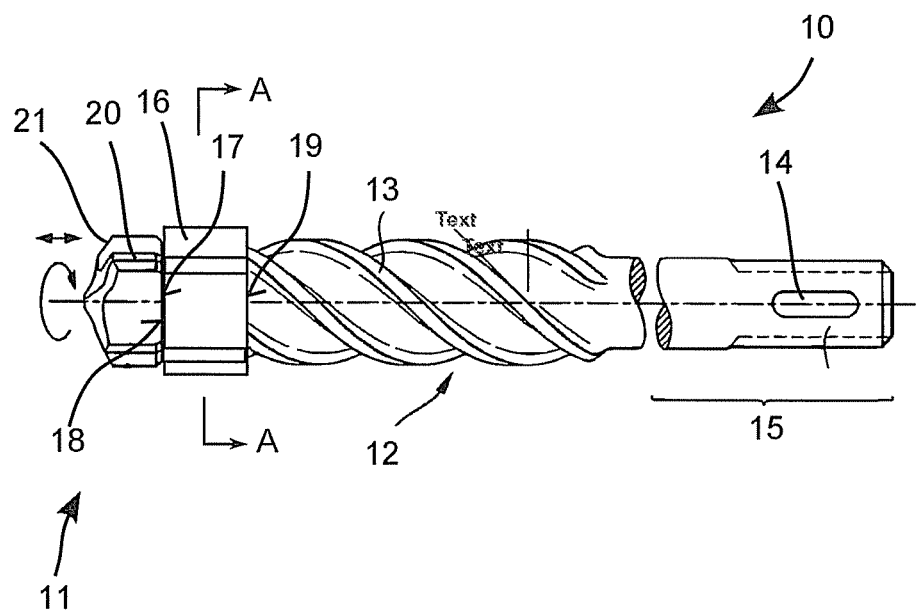

DRILL AND A PRODUCTION METHOD FOR A DRILL

CROSS-REFERENCE TO RELATED APPLICATIONS

The present application claims priority to German Patent Application No. DE 10 2011 081 948.7, filed Sep. 1, 2011, which is hereby incorporated by reference herein in its entirety.

BACKGROUND OF THE INVENTION

Some embodiments of the present invention relate to drills and/or drill bit milling stones by way of drilling. Other embodiments of the present invention relate to production methods for drills and/or drill bits.

BRIEF SUMMARY OF THE INVENTION

Some embodiments provide a drill. The drill includes, for example, a drill bit, a shaft and an intermediate part. The drill bit includes a sintered hard metal that includes carbon. The intermediate part includes a sintered intermediate part that is iron-based. The sintered intermediate part is arranged along an axis between the drill bit and the shaft. An activity of the carbon in the sintered intermediate part in a temperature range from 1100° C. to 1470° C. is greater than or equal to the activity of the carbon in the sintered hard metal in the temperature range.

Some embodiments provide a method for producing a drill. The method includes, for example, one or more of the following: forming a green body from a hard metal and a binder into a drill bit, wherein the hard metal includes carbon; forming an intermediate part from an iron-based powder that includes carbon; joining the drill bit and the intermediate part into a semi-finished product; sintering the semi-finished product at a temperature at which an activity of the carbon in the intermediate part is greater than or equal to the activity of the carbon in the green body; and joining the sintered semi-finished product onto a shaft in a material-to-material fashion.

Some embodiments provide a drill assembly. The drill assembly includes, for example, a drill bit, a shaft and a sintered intermediate part. The drill bit includes a sintered hard metal. The shaft is disposed between the drill bit and a sintered intermediate part. The sintered intermediate part is iron-based. The sintered hard metal and the intermediate part include carbon. An activity of the carbon in the sintered intermediate part at a particular temperature in a temperature range from 1100° C. to 1470° C. is greater than or equal to the activity of the carbon in the sintered hard metal at the particular temperature.

BRIEF DESCRIPTION OF THE DRAWING

The FIGURE shows an embodiment of a drill.

DETAILED DESCRIPTION OF THE INVENTION

In one embodiment, a drill includes a drill bit, an intermediate part, and a shaft. The drill bit is made from a sintered carbon-containing hard metal. The intermediate part is made from steel and arranged along an axis between the drill bit and the shaft. At a temperature range from 1100° C. to 1450° C., an activity of carbon in the ferrous intermediate part is equivalent and/or greater than an activity of carbon in a sintered hard metal at the temperature range.

The activity is a measure for the change of a chemical potential as the result of a change of concentration, here following a local change of the concentration of carbon. To lower the Gibb enthalpy the carbon typically diffuses into areas in which its activity is lower and it can lower the chemical potential on average. The activity of carbon in steel typically increases both with a reducing temperature in the range from 1000° C. to 1400° C. as well as increasing carbon concentration. In hard metals, particularly in tungsten carbide embedded in metallic binders, the activity shows in this temperature range a lower dependency on temperature. The activity of the hard metal and preferably the intermediate part can be influenced via its concentration of carbon and by adding other alloy substances. Furthermore, the activity can also be influenced by the processing environment. For example, a hydrogen-or oxygen-rich processing atmosphere lowers the concentration of carbon in steel and indirectly the activity of carbon. The activity of carbon in steel or hard metal can be determined, for example, in an oxygen-containing gaseous atmosphere. The chemical potential and the activity of the carbon in the solid body can be deducted from the carbon dioxide concentration developing here. A similar measuring method is known, for example, from JP 4225858 B2. Based on the composition of the substance, initial calculations allow for the determination of the activity of carbon in steel or hard metal. For the determination of the activity of the drill produced, material samples must be taken at least 50 μm away from the joint site between the drill bit and the intermediate part; inside the joint site, a compensation of the chemical potential of carbon can occur during the production due to diffusion.

A production method according to one embodiment for a drill includes the steps of: shaping a green body from a carbon-containing hard metal and a binder into a drill bit; shaping an intermediate part from a carbon-containing iron-based powder; joining the drill bit and the intermediate part to form a semi-finished part; sintering the semi-finished part at a temperature at which an activity of the carbon in the intermediate part is at least equivalent to the activity of the carbon in the green body; and a material-to-material bonding of the sintered semi-finished part on a shaft. The joint zone between the drill bit and the intermediate part is subject to very high mechanical stress in a drill, particularly a drill bit. Accordingly, the quality and stability of the joint zone is noteworthy. Attempts to bond the drill bit on the intermediate part by way of sintering resulted, in most types of steel, in brittle, easily breaking phases in the joint zone, showing microscopic hollow spaces. Using expensive test sequences, the activity of the carbon can be identified as a suitable parameter, which, if selected in the drill bit maximally equivalent to the one in the intermediate part, can prevent the formation of a brittle joint zone. The concentration of the carbon in the hard metal is considerably higher, measuring approximately 5% by weight to 7% by weight, than the concentration of carbon in steel. Surprisingly, the carbon can therefore diffuse, if at all, from the low-carbon intermediate part into the more carbon-rich hard metal.

The intermediate part may be joined to the drill bit as a green body. The intermediate part and the drill bit are jointly sintered at a temperature preferably ranging from 1100° C. to 1450° C. The activity of carbon in steel is greater at this temperature than the activity in the drill bit. The activity of carbon is greater in the intermediate part at this temperature, for example, greater than 0.3. An alternative production method preliminarily sinters the drill bit at a temperature from 1300° C. to 1470° C. and joins the sintered drill bit with the green body of the intermediate part. They are joined by way of sintering at a lower temperature, for example, from 1100° C. to 1350° C. The activity of carbon must be adjusted during joining such that it is higher in the intermediate part than in the drill bit.

The activity of the carbon in the intermediate part should be high, which can be achieved by high carbon content. However, the carbon content lowers the melting temperature of the iron-based powder, which aggravates the shaping and sintering. Carbon content in the intermediate part may amount to at least 0.20% by weight, for example at least 0.5% by weight, maximally 1.5% by weight, for example maximally 1.1% by weight. A high nickel content of at least 20% to maximally 80%, preferably up to 40% may be used in order to increase the activity of the carbon, thus yielding high activity at a low concentration of carbon.

In one embodiment, a binder of the sintered hard metal shows a content ranging from 6% by weight to 9% by weight. The portion of the binder largely influences the carbon content and the activity of the carbon in the hard metal, with its hard-metallic phase preferably including binary or ternary carbides, e.g., tungsten carbide. The binder may include cobalt at a portion of at least 20% by weight. Cobalt-rich binders, e.g., binders including pure cobalt, show relatively high activity of more than 0.3 at the sintering temperatures.

In one embodiment, the drill bit is joined in a material-to-material fashion to the intermediate part by way of a sintering process. The intermediate part is preferably sintered. One embodiment provides that the length of the drill bit along the axis is equal to or smaller than a length of the intermediate part.

The FIGURE shows an embodiment of a drill 10, which is suitable for use in milling by way of drilling, for example. The drill 10 includes a drill bit 11 and a shaft 12. The shaft 12 is essentially cylindrical and may be provided with a helix 13 and with grooves 14 in the area of the shank 15.

The drill bit 11 is fastened at the shaft 12 via an intermediate part 16. The drill bit 11 is connected with its bottom 17 via a diffusion zone, which is produced by a sintering process, to a side 18 of the intermediate part 16 in a material-to-material fashion. Additionally, the drill bit 11 can be connected in a force- and form-fitting fashion to the intermediate part 16 in a thermo-mechanical fashion. The shaft 12 is connected to the other side 19 of the intermediate part 16 in a material-to-material fashion, for example, soldered or welded.

The exemplary drill bit 11 is provided with two cutting edges 20, 21. The two cutting edges 20, 21 intersect at an angle in reference to each other ranging from 20° to 120°. The drill bit 11 is produced in the form of a solid body. The entire drill bit 11 with the cutting edges 20, 21 and the pin 22 is a continuous element made from one material, for example, hard metal. The hard metal may include materials such as, for example, the hard material phase of the class of sintered tungsten carbides. Tungsten carbide is advantageously included at a portion of at least 70% of the entire hard metal. One or more carbides from the group including, for example, titanium carbide, vanadium carbide, tantalum carbide, niobium carbide, tantalum niobium carbide, molybdenum carbide, chromium carbide, zirconium carbide, and hafnium carbide may be added to the tungsten carbide. The tungsten carbide is provided in the form of granules, which show a diameter ranging from 0.4 µm to 15 µm, for example, preferably larger than 0.8 µm and/or smaller than 10 µm, embedded in a matrix of a metallic binder material. The binder may include an alloy of cobalt, nickel, and/or iron. The hard material phase is included in a portion of 90% by weight to 98% by weight, preferably 91% by weight to 94% by weight in reference to the entire alloy. The binder material is preferably added to the mixture at a ratio from 2% by weight to 10% by weight, preferably 6% by weight to 9% by weight.

The shaft 12 is made from steel. The steel is preferably unprocessed or low-level processed, which means the additives to the steel are mixed in at respective portions of less than 5% by weight; in one example, the steel shows a nickel content of less than 2% by weight. The intermediate part 16 including a ferrous alloy is preferably welded or soldered to the shaft 12 made from steel. A joint zone of high quality is ensured by the high iron content in the intermediate part 16.

The production method for the drill 10 occurs as follows. The drill bit 11 is produced by a powder-metallurgical process. Granulate of a hard metal, e.g., tungsten carbide, mixed with a metallic binder material, e.g., cobalt, nickel, iron, chromium, molybdenum, or an organic matrix, is compression molded. Alternatively, the mixture may be injection molded. The organic matrix is removed therefrom. In this stage the product is called a green body. The green body of the drill bit 11 essentially shows the form of the later drill bit 11. At a temperature of 1300° C. to 1470° C. the green body is sintered. The sintering of hard metal on a tungsten carbide cobalt basis occurs, for example, at a temperature above 1330° C. The sintering temperature is therefore higher than the melting temperature of cobalt carbon and thus also higher than the one of tungsten carbide cobalt carbon eutectic (1309° C. and/or 1320° C.). A mixture including tungsten carbide crystals embedded in a cobalt-rich binder phase can be implemented in a powder-metallurgic method. When a powder mixture is sintered, for example, including fine-grained tungsten carbide and 6% by weight cobalt at 1400° C., equilibrium develops between solid tungsten carbide and a melt according to the concentration. In case of a sufficiently slow cooling first additional tungsten carbide precipitates, which preferably crystallizes at tungsten carbide still or already present. In the same manner, the tungsten carbide of the eutectic is also accumulating so that no typical eutectic structure is observed in the mixture of the hard metals. At the first occurrence of a liquid phase, the bending resistance of the green bodies largely increases due to strong compacting. The liquid phase covers the carbide crystals and penetrates into the pore spaces and capillaries and thus leads to a non-porous structure. The level of filled space achieved and required for drill bits then ranges, depending on the type of alloy, from 99.8% to 99.95%. The formation of carbides in the structure of the hard metal is notable here.

The intermediate part 16 is also produced by a powder-metallurgic method. The iron-based alloy is compression molded as a granulate in an organic matrix. Alternatively, the mixture may also be injection molded. The organic matrix is subsequently removed to produce the green body of the intermediate part 16. The finished sintered drill bit 11 is placed upon the green body of the intermediate part 16. At a temperature between 1100° C. and 1350° C., the green body is sintered abutting the drill bit 11. The sintering of the iron alloys used can occur at lower temperatures in reference to the hard metal without any loss with regard to mechanic stability. However, with decreasing temperature the duration of the sintering process increases disproportionately. Therefore, temperatures ranging from 1200° C. to 1350° C. are preferred. During the sintering of the green body for the intermediate part 16, a material-to-material and/or form-fitting connection develops between the already sintered drill bit 11 and the forming intermediate part 16. The material composition of the drill bit 11 and the intermediate part 16 are suitably selected here, otherwise a joint zone that develops is insufficient for the mechanic stress to which drill bits are subjected. In the following, suitable examples are discussed in detail.

The semi-finished product including the joint-sintered drill bit and the intermediate part is welded or soldered onto the shaft. The material composition of the intermediate part is well adjusted to the ability for welding to the shaft.

In the following, examples for material compositions of the hard metal and the intermediate part are disclosed by which a drill 10 can be produced successfully in the desired quality.

A first group of the hard metal includes a hard substance based on metal carbide, preferably tungsten carbide, and a metallic binder, predominantly made from cobalt. The binder shows a portion of 6% by weight to 9% by weight. The carbon content in the hard metal is largely limited, the content ranges from 5.55% by weight to 5.60% by weight. In an only slightly higher content, for example, of 5.62% by weight, the activity of the carbon at typical temperatures during the sintering process amounts to more than 0.6; here no compositions for iron-based intermediate parts can be found, which allow sintering joints without forming a weakened joint zone.

A second group of hard metals includes a hard substance based on metal carbide, preferably tungsten carbide, and a metallic binder based on ferronickel. The binder shows a portion from 7.5% by weight to 8.5% by weight in the overall hard metal. In reference to the binder, the iron content amounts to at least 55% by weight and maximally 85%, the nickel compound at least 18% by weight and maximally 23% by weight. Another component of the binder may be cobalt with a portion ranging from 18% by weight to 23% by weight. A particular feature of these hard metals is their relatively low carbon activity between 0.25 and 0.3 over a temperature range from 1100° C. to 1350° C. A carbon content of the hard metal is selected in a range from 5.65% by weight to 5.75% by weight to achieve the desired hardness of the hard metal. Examples of the second group include Fe80Ni20 and Fe60Ni20Co20.

A third group of hard metals includes a hard material based on metal carbide, preferably tungsten carbide, and a metallic binder on n ferronickel base. The binder shows a portion from 7.5% by weight to 8.5% by weight of the overall hard metal. In reference to the binder, the iron content ranges from 60% by weight to 70% by weight, the nickel content from 30% by weight to 35% by weight. A remaining portion of the binder may be cobalt, for example. The carbon content of the hard metal is selected ranging from 5.65% by weight to 5.75% by weight. An example of the third group is Fe64.2Ni31Co4.8. The activity of the carbon in the third group is slightly higher than in the second group, approximately from 0.28 to 0.32 over the temperature range between 1000° C. and 1400° C.

A first group of substances for the intermediate part is based on ferronickel alloys. The nickel alloy preferably ranges from 20% by weight to 40% by weight. Cobalt may be mixed in at a portion of up to 20% by weight. The dominant substance is iron. Other metal additions and silicon have an overall portion of less than 1.0% by weight. Examples are Invar (FeNi36) and Kovar (FeCoNi29).

The second group of substances for the intermediate part is based on low-alloy steel with a chromium portion ranging from 1.2% by weight to 2% by weight. The dominant portion is iron. Further metallic additions and silicon show an overall portion of less than 1.0% by weight. An example is DIN 100Cr6. At a temperature of 1250° C., a carbon activity exists at 0.27.

A joining by way of sintering the green body, pressed into a drill bit and including the first hard metal, may be achieved with the first group of substances of the intermediate part with a joint zone free from brittleness. With a carbon portion of at least 0.6% by weight the activity of the carbon may be adjusted to a value above the activity of the first hard metal. A carbon content of more than 0.8% by weight leads to the melting of the compressed green body of the intermediate part during the joining by way of sintering and consequently to a poor joint and faulty material composition due to the onset of material diffusion. The compositions with high nickel content, such as Invar (nickel content>30% by weight) sometimes show a lowering of the melting temperature, beginning at 0.8% by weight, into the range of sintering temperatures required for the drill bit.

With a carbon portion of 0.65% by weight, Invar can be joined to the first hard metal (8.0% by weight cobalt, 5.60% by weight carbon) by sintering at 1250° C. without any brittle phases and melting of the green body. The activity of carbon amounts in the intermediate part to approximately 0.66 and in the hard metal to 0.6. The slightly increased activity of carbon in Invar is considered the reason for the good bonding. With Invar showing 0.4% by weight carbon a brittle joint zone developed; the activity of the carbon at the sintering temperature of 1250° C. amounts to only 0.4 in Invar. The activity of carbon can be arbitrarily raised by increasing the carbon content. However, starting at 0.75% by weight carbon, experiments with Invar have shown a lowering of the melting temperature, thus the intermediate part loses its shape during the sintering process. Accordingly, only a narrow window develops for suitable compositions of substances.

Kovar with 0.7% by weight can be joined on a first hard metal (8.0% by weight cobalt, 5.60% by weight carbon) by way of sintering at 1250° C. without any brittle phases and melting of the green body. The activity of the carbon is lower in Kovar, showing slightly less nickel, compared to Invar, when the carbon content is identical. The activity of the above-mentioned composition amounts to approximately 0.7. Below a carbon content of 0.5% by weight, good connections were sometimes possible, particularly only in the case of low sintering temperatures. Any melting cannot be observed up to 0.8% by weight carbon.

The sintering temperature influences the activity of the carbon of the first group of substances and the first hard metals. The activity drops in the first group of substances with increasing temperature and rises opposite thereto in the first hard metals. A low sintering temperature in the range from 1100° C. to 1350° C. has proven advantageous for the joining of these combinations by way of sintering. Any sintering at even lower temperatures leads to a possibly faulty embodiment and connection of the drill bit.

The second group of substances can also be joined with the first hard metal by way of sintering. 100Cr6 can be used with a carbon portion ranging from 0.8% by weight to 1.1% by weight without any brittle phase and melting. The selected sintering temperature amounted to approximately 1250° C.

The second group of hard metals can also be joined with the first group of substances by way of sintering. The sintering temperatures can be selected ranging from 1100° C. to 1470° C. A carbon content starting at 0.2% by weight in the first group of substances proves sufficient, which is allocated to the lower activity of the carbon in the second hard metals (e.g., tungsten carbide with Fe80Ni2 or tungsten carbide with Fe60Co20Ni20). An upper limit for the carbon content results from the thermal behavior of the first group of substances.

Invar with a carbon content of 0.27% by weight can be joined with the second hard metal with 7.5% by weight Fe80Ni20 at 1250° C. without any weak spots. Kovar with 0.29% by weight can be joined with hard metal. The carbon content of Kovar can exceed 0.25% by weight. The second group of substances can also be joined to the hard metal.

100Cr6 with a carbon content of 0.81% by weight shows no brittle phase and is mechanically stable at 1250° C.

Invar can also be joined with the third group of hard metals by way of sintering. At 1250° C., a carbon content of 0.35% by weight in Invar yielded a good connection with the hard metal of tungsten carbide and Fe64.2Ni31Co4.8. Kovar can be joined under the same conditions with a carbon content of 0.37% by weight.

In another embodiment the joining process is modified such that the drill bit is not preliminarily sintered. The green body of the drill bit is brought together with the green body of the intermediate part. At a sintering temperature from 1250° C. to 1460° C., the green bodies of the drill bit and the intermediate part are simultaneously sintered.

Experiments failed to also attach a green body of the drill bit made from the first hard metal by way of sintering on an intermediate part made from a carbon-containing Invar. The activity of the carbon indeed drops rapidly in the first hard metal, starting at approximately 1380° C., however it seems to be sufficient to compensate the activity in Invar dropping with increasing temperature. The increase of activity by a high carbon content exceeding 50% by weight leads to a thermally instable intermediate part at sintering temperatures of about 1400° C.

A drill bit made from the second hard metal, e.g., Fe80Ni20, may be co-sintered with an intermediate part made from Invar with a carbon content of 0.36% by weight. At temperatures ranging from 1300° C. to 1400° C., the intermediate part proves to be thermally stable and an activity with 0.35 (at 1300° C.) to 0.25 (1400° C.) is sufficiently high compared to the activities of 0.2 in the second hard metal. A carbon content ranging from 0.3% by weight to 0.48% by weight allows a co-sintering in the temperature range.

A drill bit made from the second hard metal, e.g., Fe80Ni20, can be co-sintered with Kovar showing a carbon content of 0.48% by weight. Kovar proves to be more stable thermally in reference to Invar, allowing a higher carbon content.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A drill, comprising:
a drill bit that includes a sintered hard metal, wherein the sintered hard metal includes carbon;
a shaft; and
a sintered intermediate part that is iron-based,
wherein the sintered intermediate part is arranged along an axis between the drill bit and the shaft, and
wherein an activity of the carbon in the sintered intermediate part in a temperature range from 1100° C. to 1470° C. is greater than or equal to the activity of the carbon in the sintered hard metal in the temperature range.

2. The drill according to claim 1, wherein the sintered intermediate part shows a carbon content of at least 0.20% by weight.

3. The drill according to claim 2, wherein a binder of the sintered hard metal shows a portion ranging from 6% by weight to 9% by weight.

4. The drill according to claim 3, wherein the binder is predominantly made of cobalt, and wherein the sintered intermediate part has a carbon content ranging from 0.6% by weight to 1.1% by weight.

5. The drill according to claim 3, wherein the binder includes nickel at a portion from 18% by weight to 23% by weight, and wherein the sintered intermediate part has a carbon content from 0.2% by weight to 1.1% by weight.

6. The drill according to claim 1, wherein a binder of the sintered hard metal shows a portion ranging from 6% by weight to 9% by weight.

7. The drill according to claim 6, wherein the binder includes cobalt at a portion of at least 80% by weight, and wherein the sintered intermediate part has a carbon content ranging from 0.6% by weight to 1.1% by weight.

8. The drill according to claim 6, wherein the binder includes cobalt at a portion from 18% by weight to 23% by weight, and wherein the sintered intermediate part has a carbon content from 0.2% by weight to 1.1% by weight.

9. The drill according to claim 1, wherein a length of the drill bit along the axis is greater than or equal to a length of the intermediate part.

10. A method for producing a drill, comprising:
forming a green body from a hard metal and a binder into a drill bit, wherein the hard metal includes carbon;
forming an intermediate part from an iron-based powder that includes carbon;
joining the drill bit and the intermediate part into a semi-finished product;
sintering the semi-finished product at a temperature at which an activity of the carbon in the intermediate part is greater than or equal to the activity of the carbon in the green body; and
joining the sintered semi-finished product onto a shaft in a material-to-material fashion.

11. The method according to claim 10, wherein the drill bit as a green body is co-sintered with the green body of the intermediate part at a temperature in a temperature range of 1250° C. to 1470° C.

12. The method according to claim 10, wherein the drill bit is formed as a green body, the green body is sintered at a first temperature in a temperature range of 1250° C. to 1470° C., and the sintered drill bit is joined by sintering to the green body of the intermediate part at a second temperature in a second temperature range of 1100° C. to 1350° C.

13. The method according to claim 11, wherein the activity of carbon in the intermediate part is greater than 0.3 at the temperature.

14. The method according to claim 13, wherein the hard metal includes metallic binders from 6% by weight to 9% by weight, wherein the iron-based powder includes the carbon by at least 0.20% by weight.

15. The method according to claim 14, wherein the iron-based powder includes the carbon from 0.2% by weight to 1.1% by weight.

16. The method according to claim 14, wherein the metallic binders is predominantly made of cobalt, and wherein the iron-based powder includes the carbon from 0.6% by weight to 1.1% by weight.

17. The method according to claim 14, wherein the metallic binders include nickel from 18% by weight to 23% by weight.

18. The method according to claim 10, wherein the intermediate part includes chromium from 1.2% by weight to 2.0% by weight and a carbon content from 0.7 to 1.1% by weight.

19. A drill assembly, comprising:
a drill bit that includes a sintered hard metal;

a shaft disposed between the drill bit and a sintered intermediate part; and
the sintered intermediate part that is iron-based,
wherein the sintered hard metal and the intermediate part include carbon, wherein an activity of the carbon in the sintered intermediate part at a particular temperature in a temperature range from 1100° C. to 1470° C. is greater than or equal to the activity of the carbon in the sintered hard metal at the particular temperature.

* * * * *